United States Patent [19]

Kakinuma et al.

[11] Patent Number: 5,041,145
[45] Date of Patent: Aug. 20, 1991

[54] BRIDGED STREAM CORONA GENERATOR

[75] Inventors: Mikio Kakinuma, Nagareyama; Yukio Ikeda, Ryugasaki; Satoshi Uchida, Tsukuba, all of Japan

[73] Assignee: Niles Parts Co., Ltd., Tokyo, Japan

[21] Appl. No.: 524,236

[22] Filed: May 15, 1990

[51] Int. Cl.⁵ .............................. B03C 3/00
[52] U.S. Cl. ........................ 55/122; 55/152; 55/146; 55/DIG. 30; 60/275
[58] Field of Search ............... 55/118, 119, 122, 123, 55/152, 146, 155, DIG. 30; 60/275

[56] References Cited

U.S. PATENT DOCUMENTS

| | | | |
|---|---|---|---|
| 1,381,719 | 6/1921 | McGee et al. | 55/122 |
| 1,787,955 | 1/1931 | Rosecrans | 55/123 |
| 1,828,631 | 10/1931 | Whitney | 55/118 |
| 1,828,646 | 10/1931 | Dantsizen | 55/151 |
| 1,957,808 | 5/1934 | Rosecrans | 55/151 |
| 3,157,479 | 11/1964 | Boles | 60/275 |
| 3,768,258 | 10/1973 | Smith et al. | 60/275 |
| 3,917,470 | 11/1975 | Xmris et al. | 55/118 |
| 3,979,193 | 9/1976 | Sikich | 55/123 |
| 4,010,011 | 3/1977 | Reif | 55/155 |
| 4,905,470 | 3/1990 | Reichle et al. | 55/123 |

FOREIGN PATENT DOCUMENTS 298476 7/1917 Fed. Rep. of Germany .
57-20510 2/1982 Japan .

Primary Examiner—Bernard Nozick
Attorney, Agent, or Firm—Ronald P. Kananen

[57] ABSTRACT

The present invention provides a bridged stream corona generator including a first electrode comprising an electrical conductor having projections on its surface; a second electrode again comprising an electrical conductor, which is located in opposition to the first electrode; insulator means applied on at least the side of the second electrode in opposition to the first electrode; a high voltage power source connected to the first and second electrodes; and means for feeding a viscous oil onto the side of the insulator means which directs to the first electrode. With this arrangement, it is possible to smooth out irregularities caused by deposits on the side of the insulator means which faces the first electrode, thereby contributing to maintaining bridged stream corona discharge in a stable manner. The present corona generator lends itself well to purifying exhaust fumes from automobiles by corona discharge.

6 Claims, 2 Drawing Sheets

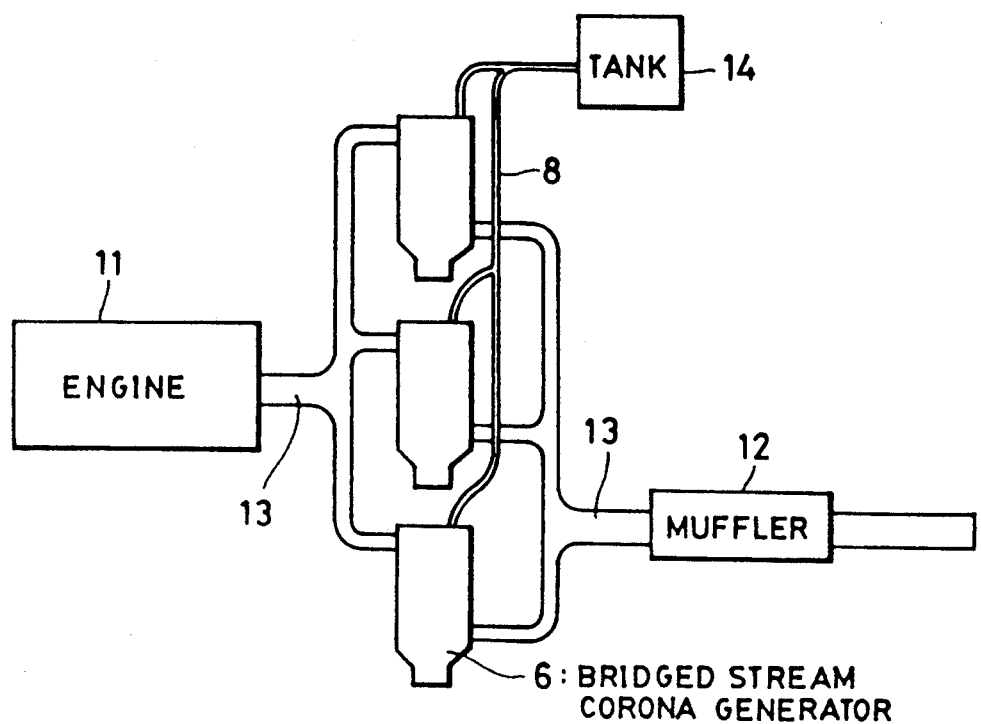
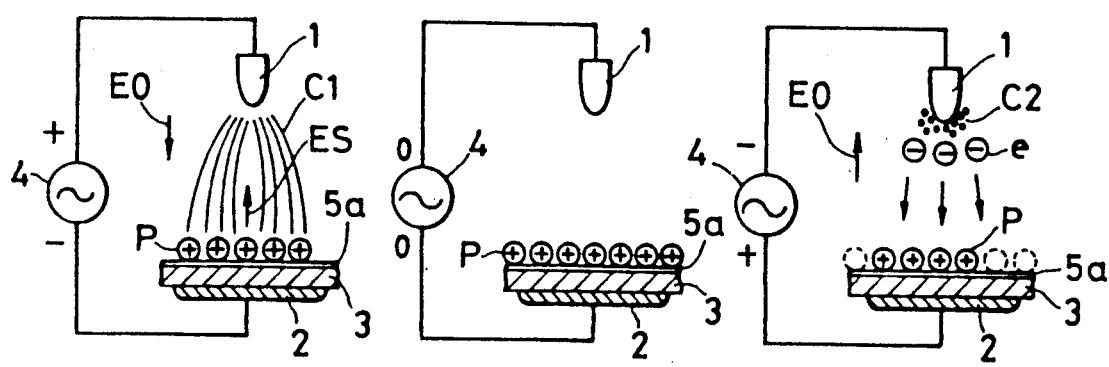

BRIDGED STREAM CORONA GENERATOR

BACKGROUND OF THE INVENTION

1. Field of the Invention

The present invention relates to a corona generator used to purify automotive exhaust gases by corona discharge and for other purposes and, more particularly, to a bridged stream corona generator which can stably generate and maintain bridged stream corona discharge over an extended period of time.

2. Prior Art

One of techniques heretofore used to this end is disclosed in Japanese Patent Kokai Publication No. 57 (1982)-20510. According to the disclosure, this prior art comprises a corrugated dust collector in a cylindrical form and a desired number of discharge lines laid across a hollow portion of the dust collector. With a high voltage applied on the discharge lines, fine particles such as tar particles and graphite in exhaust gas are removed. More specifically, fine particles floating in exhaust gas are attracted and deposited on the inner wall of the cylindrical dust collector by the action of an intensive electrostatic field for their removal.

With such a prior art as mentioned above, however, it is likely that the discharge lines may be torn down, when spark discharge occurs between the dust collector and the discharge lines.

Another disadvantage is that it is still less than satisfactory in the force with which harmful gases in exhaust fumes such as $NO_x$ and $CO_x$ are attracted and deposited.

Recently, it has been proposed to make use of corona discharge as effective means for generating discharge to activate such harmful gases for their dissociation and elimination. With general corona discharge, however, it is impossible to obtain any desired force with which dust, etc. contained in exhaust gas can be attracted or dissociated.

In order to put to practical use the technique for dissociating and eliminating harmful gases by said corona discharge, on the other hand, it is required to generate specific coronas, i.e., bridged stream coronas and provide an increased generation of the bridged stream coronas.

In order to generate the bridged stream coronas stably over an extended period of time, it is then required to eliminate the influence of, for instance, the deposition of carbonized particles, etc. upon generating the bridged stream coronas.

SUMMARY OF THE INVENTION

The present invention, accomplished with the foregoing in mind, provides a bridged stream corona generator including a first electrode comprising an electrical conductor having projections on its surface; a second electrode again comprising an electrical conductor, which is located in opposition to the first electrode; insulator means applied on at least the side of the second electrode in opposition to the first electrode; a high voltage power source connected to the first and second electrodes; and means for feeding a viscous oil onto the side of the insulator means which directs to the first electrode. With this arrangement, it is possible to smooth out irregularities caused by deposits on the side of the insulator means which faces the first electrode, thereby achieving the stable generation of bridged stream corona discharge.

According to another aspect of the present invention, there is provided an exhaust gas purifier comprising an exhaust pipe to be connected to an automotive engine and a desired number of bridged stream corona generators connected to the exhaust pipe, said bridged stream corona generators each including a first electrode comprising an electrical conductor having projections on its surface; a second electrode again comprising an electrical conductor, which is located in opposition to the first electrode; insulator means applied on at least the side of the second electrode in opposition to the first electrode; a high voltage power source connected to the first and second electrodes; and means for feeding a viscous oil onto the side of the insulator means which directs to the first electrode. This arrangement makes a contribution to the purification of exhaust fumes from automobiles.

BRIEF DESCRIPTION OF THE DRAWINGS

Some embodiments in accordance with the present invention will now be described, by way of example, with reference to the accompanying drawings in which:

FIG. 2 is a view illustrating the bridged stream corona generators of FIG. 1, which is attached to an exhaust pipe of an automobile, and FIGS. 3 to 5 are schematic views for illustrating the generation of coronas according to the present invention, FIG. 3 showing the generation of coronas of positive polarity, FIG. 4 a zero point state and FIG. 5 the generation of coronas of negative polarity.

DETAILED DESCRIPTION OF THE EMBODIMENTS

Figure 1:
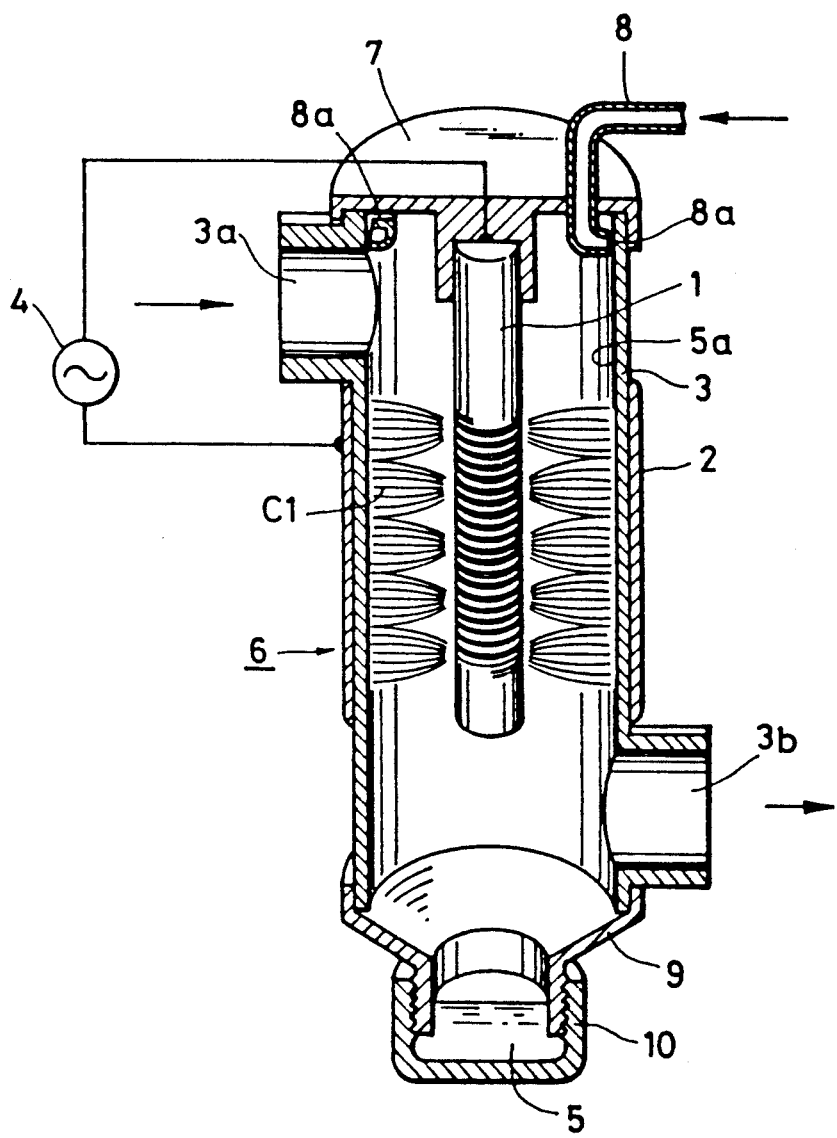
FIG. 1 is a vertically sectioned view showing a preferred embodiment of the present invention.

The bridged stream corona generator of the above structure according to the present invention operates as follows.

With a high voltage impressed between the first and second electrodes by the high voltage power source, a bridged stream coronas occur between the first electrode and the insulator applied on the inner face of the second electrode, as shown in FIGS. 3 to 5.

Referring to FIG. 3, plus and minus voltages are impressed by a high voltage power source 4 on first and second electrodes 1 and 2, respectively.

An arrow shown by EO in FIG. 3 stands for the direction of an electric field established by a high voltage applied between the first and second electrodes 1 and 2, while an arrow shown by ES denotes the direction of an inverse electric field created by charges accumulated on the face of an insulator 3 covered with a viscous oil film 5a. Plus charges built on the surface of the insulator 3 are indicated by P, while coronas of positive polarity, esp., bridged stream coronas obtained by the maximum growth of the coronas of positive polarity, is shown by C1.

In such a state as shown in FIG. 3, the bridged stream coronas C1 are generated with the buildup of the plus charges P on the surface of the insulator 3. Depending upon the quantity of the plus charges P, the inverse electric field ES is intensified to control the bridged stream coronas C1. As time goes by, the bridged stream coronas C1 change and attenuate to brush or film-like coronas, which occur only in the vicinity of the first electrode 1.

Such change and attenuation of the bridged stream coronas C1 result from the quantity of the plus charges P being too increased. With means taken for reducing excessive plus charges P, the bridged stream coronas C1 are caused to increase and grow.

In this invention, the generation of the bridged stream coronas C1 is ensured by neutralizing and reducing excessive plus charges P through the stages shown in FIGS. 4 and 5, as will be described just below.

FIG. 4 illustrates the so-called zero-point state where the switchover of the output polarity of the high voltage power source 4 takes place. In the state shown in FIG. 4, the generation of the coronas interrupts transitorily.

FIG. 5 illustrates a state of the polarity opposite to that shown in FIG. 3, where minus and plus voltages are respectively applied to the first and second electrodes 1 and 2 through the high voltage power source 4.

In FIG. 5, e stands for electrons and C2 indicates coronas of negative polarity.

In the state shown in FIG. 5, the first electrode 1 emits the coronas C2 of negative polarity and the electrons e, the latter of which are bound to, and are neutralized with, the plus charge P built up on the surface of the insulator 3.

This results in a reduction of excessive plus charges P, and when the state shown in FIG. 3 is again reached, the bridged stream coronas C1 are generated.

As mentioned above, the continuous generation of the bridged stream coronas C1 is maintained and ensured by repeating the stages shown in FIGS. 3 to 5. Then, irregularities caused by deposits such as carbonized particles on the insulator 3 are smoothed out by the aforesaid viscous oil film 5a, thereby generating the bridged stream coronas C1 stably over an extended period of time.

DESCRIPTION OF PREFERRED EMBODIMENT

The present invention will now be explained, by way of example, with reference to one embodiment in which the invention is applied to a purifier for cleaning automotive exhaust fumes of harmful gases.

FIG. 1 is a vertically sectioned view of a bridged stream corona generator built in an exhaust pipe and shown generally at 6.

The first electrode 1 may be formed by threading a stainless rod, for instance, by suitable means such as cutting machinery, e.g., a milling machine or molding machinery, e.g., a sintering machine. Then, the first electrode 1 is provided on its surface with projections, each of a rectangular or trapezoidal shape in section, by varying the pitch of thread.

The first electrode 1 is centrally located by a supporting member 7 formed of an insulating material within a cylindrical housing including an insulator 3 formed of a material such as ceramics.

Applied on the outside of the insulator 3 is a second electrode 2.

The second electrode 2 may be formed by printing a metallic paste on the surface of the insulator 3 of, e.g., ceramics, followed by firing. Alternatively, the second electrode 2 previously formed of a metallic pipe may be applied on its surface with an enamel coating of, e.g., organic glass to form the insulator 3. It is to be understood that a mere combination of an insulating pipe with a metallic pipe may be used for the same purpose.

The first and second electrodes 1 and 2 are electrically connected to each other through a high voltage power source 4. The high voltage power source 4 is a circuit for generating a high voltage of both positive and negative polarities at a certain frequency, with the waveform being either a sine wave or a pulse wave.

The frequency applied may be kept either constant or in synchronism with the number of rotation of an engine such as the output of an ignition coil.

In FIG. 1, reference numeral 8 stands for an oil feed pipe acting as means for forming a viscous oil film 5a on the surface of the insulator 3 and fixed to the supporting member 7.

The oil feed pipe 8 includes a hole 8a located adjacent to the insulator 3, through which droplets of a viscous oil 5 having a given viscosity such as an engine oil is fed from the upper end of the insulator 3.

A receiver 9 for receiving the viscous oil 5 is located, which is threadedly provided with a cap 10 for discharging it.

At upper and lower positions of the insulator 3, there are provided connection holes or an inlet and an outlet 3a and 3b, through which it is connected to an exhaust pipe 13 to be described later.

The thus constructed bridged stream corona generator 6 is positioned somewhere in a path defined by the exhaust pipe 13 making a connection between an engine 11 and a muffler 12, as shown in FIG. 2.

The oil feed pipe 8 of the bridged stream corona generator 6 is connected to a tank 14 in which the viscous oil 5 is stored.

Referring again to FIG. 2, three such bridged stream corona generators 6 are positioned in parallel in the path defined by the exhaust pipe 13. It is to be noted, however, that their number may be varied in dependence upon the engine's displacement and other factors. At its junctions with the bridged stream corona generators 6, in this case, the exhaust pipe 13 may be branched out in correspondence to their number.

Alternatively, the bridged stream corona generators 6 may be made integrate with the muffler 12.

With such an arrangement, extensive bridged stream coronas C1 are stably generated and maintained within a space defined by the first electrodes 1 and the insulator layers 3 of the bridged stream corona generators 6. As the exhaust gas passes through such extensive bridged stream coronas, harmful gases such as $NO_x$ and $CO_x$ are activated and dissociated by the action thereof into other purified gases or water, thereby preventing them from being spewed into the atmosphere.

It is here noted that irregularities caused by deposits such as carbonized particles on the surface of the insulator 3 serve to limit the generation of the bridged stream coronas C1, resulting in a reduction of the function of purifying exhaust gas. However, such irregularities are smoothed out by the viscous oil film 5a defined by the viscous oil 5 added dropwise from the upper end of the insulator 3, so that the generation of the bridged stream coronas C1 can be maintained.

The viscous oil 5 also serves to increase the dielectric constant between the first and second electrodes 1 and 2, thereby improving the efficiency of generating the bridged stream coronas C1.

Experimentation made by the present inventor has indicated that when a 50 Hz alternating current boosted to about 10 to 15 Kv by the high voltage power source 4 shown in FIG. 1 is applied between the first and second electrodes 1 and 2, far-reaching, massive bridged stream corona discharge takes place.

It has also been found that the thus obtained bridged stream coronas C1 suffer no attenuation and are stably maintained and ensured by the effect of the viscous oil film 5a on smoothing out the surface of the insulator 3.

It is to be understood that whenever at least the side of the insulator 3 facing the first electrode becomes so irregular that the bridged stream coronas C1 change to spark discharge, the viscous oil 5 may be fed dropwise from the oil feed pipe 8. For instance, the generation of said spark discharge may be detected by a sensor in the form of an electric signal, upon which a valve for the oil feed pipe 8 is opened by a time-limit circuit for a given time to feed a certain amount of droplets of the viscous oil 5 to the insulator 3. By doing so, it is possible to form the viscous oily film 5a on the surface of the insulator 3 with efficiency.

Alternatively, an amount of the viscous oil 5 collected in the receiver 9 during operation may be drawn up by a pump, etc. on the side of the oil feed pipe 8 for recirculation.

In this case, the viscous oil 5 collected in the receiver 9 may be fed back to the oil feed pipe 8 through a filter for the purpose of cleaning it.

In the foregoing embodiment, the hole 8a for feeding droplets of the viscous oil 5 is disposed in an annular form, as shown in FIG. 1. To this end, however, use may be made of a single (inlet) hole or a depending inlet pipe, because the viscous oil 5 may diffuse on the side of the insulator 3 facing the first electrode 1 under the action of a coulomb force in an electric field created by the high voltage power source 4.

EFFECT OF THE INVENTION

The bridged stream corona generator according to this invention is characterized in that the side of the insulator facing the first electrode includes means for feeding the viscous oil. This feature makes it possible to smooth out irregularities caused by deposits on that side of the insulator and, hence, to stably maintain and ensure extensive bridged stream corona discharge over an extended period of time.

If the bridged stream corona generators according to this invention are built in an automotive exhaust pipe, then it is possible to dissociate or remove harmful gases in exhaust fumes for their elimination.

We claim:

1. A bridged stream corona generator comprising:
 a housing including an inlet for introducing exhaust gas into said housing and an outlet for exiting purified gas from said housing;
 a first electrode located in said housing, said first electrode including an electrical conductor having projections on a surface of said electrical conductor;
 a second electrode again including an electrical conductor, which is located in opposition to the first electrode;
 insulator means applied on at least the side of the second electrode in opposition to the first electrode;
 a high voltage power source connected to the first and second electrodes for generating bridged stream coronas stably over an extended period of time to remove fine particles and harmful gases from said exhaust gas passing through said bridged stream coronas; and
 means for feeding a viscous oil onto the side of the insulator means to form a viscous oil film on an inner surface of said insulator means so that said viscous oil film removes fine particles and harmful gases attracted and deposited onto said insulator means by the action of said bridged stream coronas.

2. A bridged stream corona generator as claimed in claim 1, further comprising a receiver for receiving said viscous oil.

3. A bridged stream corona generator as claimed in claim 1, wherein said first and second electrodes and insulator means are all almost vertically located, and said means for feeding a viscous oil is constructed from an oil feed pipe designed to feed droplets of said viscous oil from the upper end of said insulator means.

4. A bridged stream corona generator as claimed in claim 3, wherein said means for feeding a viscous oil includes at least one hole adjacent said insulator means through which said droplets of said viscous oil are fed.

5. A bridged stream corona generator for purifying exhaust gas by corona discharge comprising:
 a cylindrical housing including an inlet for introducing exhaust gas into said housing and an outlet for exiting purified exhaust from said housing;
 a first electrode centrally located in said housing, said first electrode including an electrical conductor having a plurality of projections on a surface of said electrical conductor,
 a second electrode including an electrical conductor, said second electrode being located in opposition to said first electrode;
 insulator means disposed between said first electrode and said second electrode;
 means for feeding a viscous oil into said housing along an inner surface of said insulator means in the form of droplets to form a viscous oil film on said inner surface; and
 a high voltage power source connected to said first electrode and said second electrode for generating bridged stream coronas stably over an extended period of time within a space defined by said first electrode and said insulator means so that when said exhaust gas passes through said bridged stream coronas, fine particles and harmful gases are removed from said exhaust gas, attracted and deposited onto said inner surface of said insulator means, and removed from said inner surface of said insulator means by said viscous oil film.

6. A bridged stream corona generator as claimed in claim 5, wherein said means for feeding said viscous oil includes an oil feed pipe having at least one opening adjacent said insulator means to feed said droplets of said viscous oil into said housing.

* * * * *